United States Patent
Park et al.

(10) Patent No.: US 8,727,057 B2
(45) Date of Patent: May 20, 2014

(54) REAR SUSPENSION FOR THREE-WHEELED CAR

(71) Applicant: Hyundai Motor Company, Seoul (KR)

(72) Inventors: Jin-Yeon Park, Kunpo-shi (KR);
Jae-Kil Lee, Suwon-shi (KR);
Sang-Hoon Lee, Yongin-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/681,213

(22) Filed: Nov. 19, 2012

(65) Prior Publication Data

US 2013/0161920 A1 Jun. 27, 2013

(30) Foreign Application Priority Data

Dec. 26, 2011 (KR) .................. 10-2011-0142150

(51) Int. Cl.
*B62D 61/06* (2006.01)
*B62K 25/26* (2006.01)
*B60G 3/20* (2006.01)

(52) U.S. Cl.
CPC .................................... *B60G 3/207* (2013.01)
USPC .................... 180/210; 180/215; 280/124.128; 280/124.129

(58) Field of Classification Search
USPC ............ 180/210, 215; 280/124.128, 124.129, 280/124.1, 124.117, 124.121, 124.136, 280/93.502, 93.51
See application file for complete search history.

(56) References Cited

U.S. PATENT DOCUMENTS

| | | | | | |
|---|---|---|---|---|---|
| 3,245,492 | A | * | 4/1966 | Herr ............................. | 180/360 |
| 3,858,901 | A | * | 1/1975 | Johnson ................. | 280/124.138 |
| 3,917,313 | A | * | 11/1975 | Smith et al. .................. | 280/284 |
| 4,787,470 | A | * | 11/1988 | Badsey ......................... | 180/210 |
| 4,951,791 | A | * | 8/1990 | Belil Creixelli .............. | 180/219 |
| 5,000,476 | A | * | 3/1991 | Lindorfer et al. ...... | 280/124.107 |
| 5,107,950 | A | * | 4/1992 | Horiike et al. ................ | 180/219 |
| 5,908,078 | A | * | 6/1999 | Belil Creixell .............. | 180/219 |
| 6,527,289 | B2 | * | 3/2003 | Parigian ........................ | 280/284 |
| 7,334,806 | B2 | * | 2/2008 | Dreher, Jr. ................. | 280/124.1 |
| 7,641,015 | B2 | * | 1/2010 | Hasegawa et al. ........... | 180/219 |
| 8,496,083 | B2 | * | 7/2013 | Igarashi et al. ............... | 180/227 |
| 2002/0148664 | A1 | * | 10/2002 | Hanagan et al. ............. | 180/210 |
| 2004/0160030 | A1 | | 8/2004 | Walters et al. | |
| 2006/0180372 | A1 | | 8/2006 | Mercier et al. | |

FOREIGN PATENT DOCUMENTS

JP  01127475 A  *  5/1989
JP  2009-61902 A    3/2009

* cited by examiner

*Primary Examiner* — James English
(74) *Attorney, Agent, or Firm* — Morgan, Lewis & Bockius LLP

(57) ABSTRACT

A rear suspension of a three-wheeled car with two front wheels and one rear wheel in the car frame may include a wheel center connected to the rotation of axis of the rear wheel, an upper link with one side connected to the car body and the other to a wheel center, and a lower link with one side connected to the car body below the upper link and the other side to a wheel center below the upper link, wherein, the upper link and the lower link may be installed so that their connection point with the car body may be located in a higher altitude than their connection point with the wheel center, and wherein, the angle of inclination from the ground may be greater for the lower link than for the upper link.

4 Claims, 5 Drawing Sheets

REAR SUSPENSION FOR THREE-WHEELED CAR

CROSS-REFERENCE TO RELATED APPLICATION

The present application claims priority to Korean Patent Application No. 10-2011-0142150, filed on Dec. 26, 2011, the entire contents of which is incorporated herein for all purposes by this reference.

BACKGROUND OF THE INVENTION

1. Field of the Invention

The present invention relates to a rear suspension for a three-wheeled car, and more particularly, to a rear suspension for a three-wheeled car, which comprises two front wheels and one rear wheel, in which the toe angle camber angle of the rear wheel is automatically adjusted by the direction the car is turning so that the stability is enhanced when the car is turning.

2. Description of Related Art

Currently, the efforts to improve the fuel efficiency of a car are being made continuously and globally. As a part of making such efforts, the studies on improving the performance of a power-train and on reducing the weight of a car continue to be conducted.

In furtherance of this idea, a three-wheeled car has been newly developed as a more environment-friendly transportation means and as a lighter vehicle.

As mentioned above, a three-wheeled car developed with the environment-friendly and the lighter-weight concept has a structure of either one front wheel with two rear wheels triangle structure or one rear wheel with two front wheels inverted triangle structure. Compared to a four-wheeled vehicle, a three-wheeled car has the advantage of being lighter and more fuel-efficient, and yet, it has the disadvantage of having less stability while on the road.

Of the above-mentioned two types of three-wheeled cars, a swing-arm type was used mainly for a traditional rear suspension applied to a three-wheeled car with two front wheels and one rear wheel which was usually applied in the rear wheel of a motorcycle and only allowed the up-and-down motion.

In reference to FIG. 1, the traditional suspension structure of a three-wheeled car with two front wheels and one rear wheel is designed so that a H-shaped arm is connected to the rear end of the car frame through a hinge pin so that it can perform hinge movements up-and-down pivot movements and the impact be buffered by the bump and rebound movement of a shock absorber.

In other words, the rear end of the swing arm is combined with the axis of rotation of the rear wheel and the front end of the swing arm is combined with the car body, but it is composed so that it can perform up-and-down pivot movements as the ground surface is uneven.

Compared with a four-wheeled car, a three-wheeled car with one rear wheel has half the cornering force, supposing they are both equipped with identical tires. Therefore, when turning an identical corner, a three-wheeled car has a greater chance of a spin-out because its lateral force the resilience against the force applied laterally as a car turns a corner in the rear wheel is smaller than that in the rear wheels of a four-wheeled car. In other words, there was the problem of diminished stability when a three-wheeled car is turning.

Also, the swing-arm type suspension structure had a tendency for a toe-out when the lateral force is applied due to the compliance effect the effect as though the handle is being steered when the external forces change the forms of rubber bushes for suspension and hence change the alignment.

Thus, the stability of a car when it is turning is significantly reduced if it uses a swing-arm type suspension such as the one described above due to the centrifugal force and the lateral force which induce the over-steer moment.

Hence, there is the problem of a rear wheel breaking away from the right track and the stability of a car decreasing when a car is on the road.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear suspension of a three-wheeled car with greater stability when the car is turning, by inducing toe-in of the rear wheel forcibly when the car is turning.

In an aspect of the present invention, a rear suspension of a three-wheeled car with two front wheels and one rear wheel in a car frame may include a wheel center to which a rotation axis of the one rear wheel is rotatably coupled, an upper link with one end pivotally connected to a car body and the other end pivotally connected to one portion of the wheel center, and a lower link with one end pivotally connected to the car body below the one end of the upper link and the other end pivotally connected to the other portion of the wheel center below the other end of the upper link, wherein, the upper link and the lower link are installed to the car body so that the one end of the upper link is positioned higher than the other end thereof, and the one end of the lower link is positioned higher than the other end thereof, and wherein an angle of inclination from the ground between the one end and the other end of the lower link is greater than an angle of inclination from the ground between the one end and the other end of the upper link.

The upper link may include a first upper link pivotally connected to one lateral side of the wheel center and a second upper link pivotally connected to the other lateral side of the wheel center to be symmetric to the first upper link, the first upper link and the second upper link being installed to perform a four-bar linkage movement with the car body and the rear wheel, and the lower link may include a first lower link pivotally connected to one lateral side of the wheel center and a second upper link pivotally connected to the other lateral side of the wheel center to be symmetric to the first lower link, the first lower link and the second lower link being installed to perform a four-bar linkage movement with the car body and the rear wheel.

A first instantaneous center situated on intersection of extensions of the first upper link and the second upper link, and a second instantaneous center situated on intersection of extensions of the first lower link and the second lower link, are located to the rear of the rotation axis of the rear wheel.

An angle formed between the first and second upper links is smaller than an angle formed between the first and second lower links.

The first instantaneous center of the first and second upper links is located to the rear of the second instantaneous center of the first and second lower links.

The wheel center is pivotally installed on the car body through a trailing link, and the trail link is situated between the upper link and the lower link to form an axis of symmetry between the first upper link, the second upper link, the first lower link and the second lower link.

To be more specific, the rear suspension structure of the present invention is a structure in which the toe-in of the rear wheel is induced as the car turns to induce under-steer, which offsets the over-steer moment. In other words, the rear wheel turns the same direction the front wheel turns, and it prevents the spin-outs and can bring the anti-roll effect, which can increase the stability when the car is turning.

On top of that, by controlling the arrangements of the instantaneous centers of the upper link and the lower link, controlling the camber angle when the car is turning can be induced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
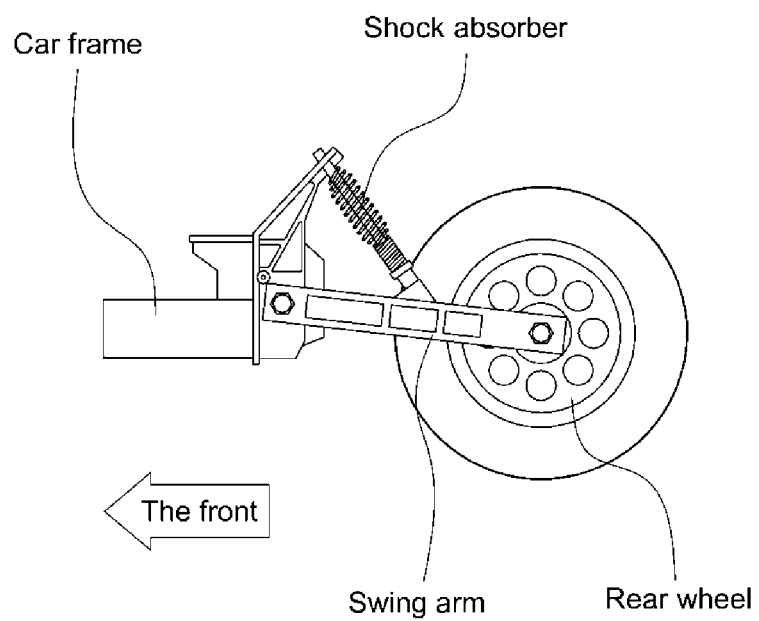
FIG. 1 is a side view illustrating the traditional rear suspension of a three-wheeled car.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereafter, with reference to the attached drawings, the exemplary embodiment of the present invention will be described in detail. Before proceeding, it should be noted that the terminologies and words used on this specification and in the claims are not to be interpreted solely as the general or dictionary meanings, and they should be interpreted as the meanings and the concept which correspond with the technological ideas of the present invention based on the principle that the inventor can properly define the concept of the terminologies in order to explain his own invention in the best possible way. Therefore, the compositions described in the exemplary embodiments and the drawings of this specification are merely the most preferred types of embodiment and they do not represent the entire technological ideas of the present invention, and thus, it should be understood that there can be a variety of equivalents and alterations, which can replace these embodiments at the time of filing this application.

Figure 2:
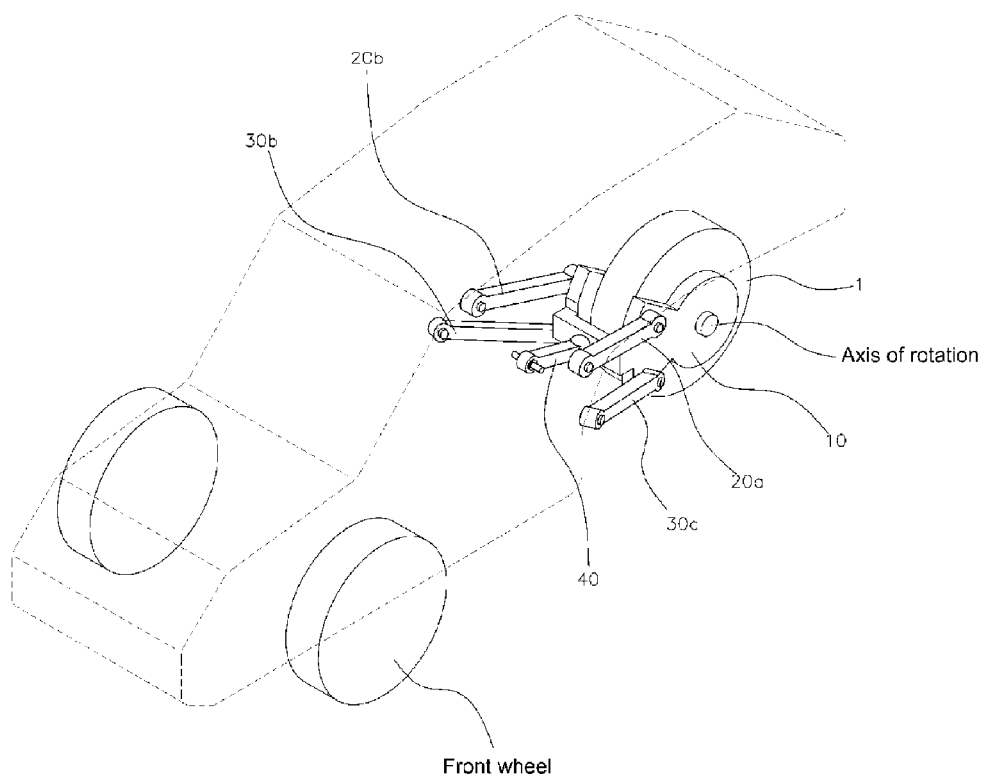
FIG. 2 is a see-through perspective view illustrating the rear suspension of a three-wheeled car according to a preferred embodiment of the present invention.
Figure 3:
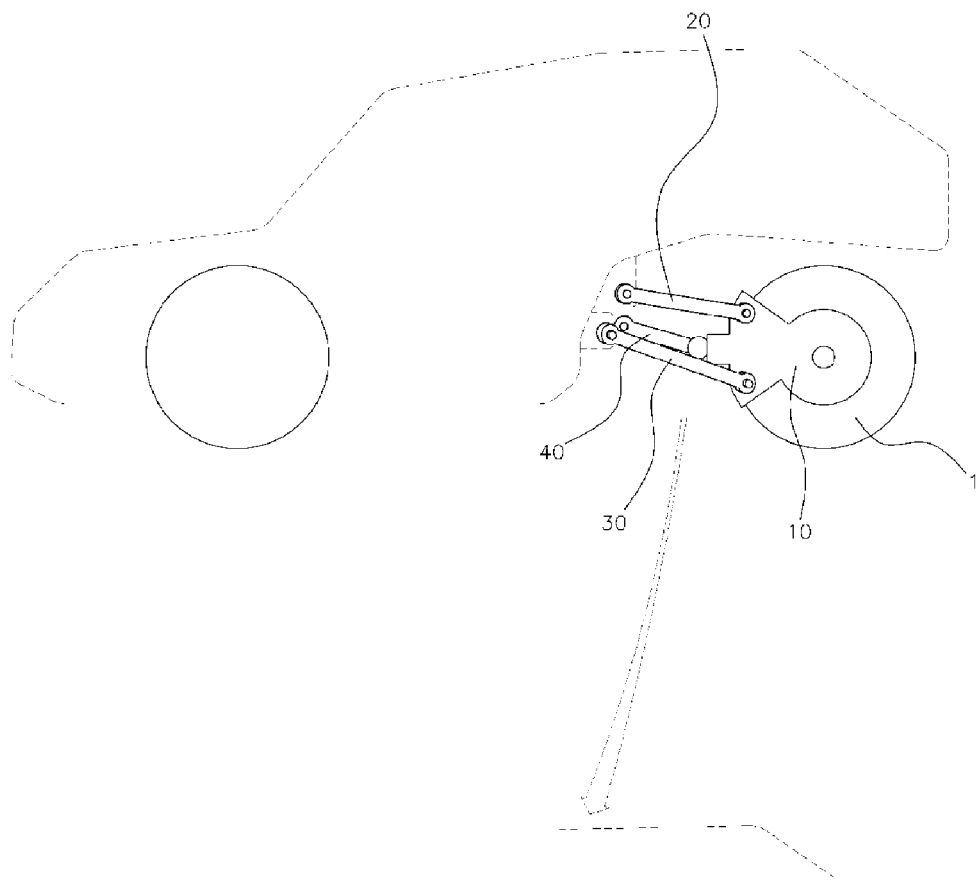
FIG. 3 is a drawing illustrating the side view of the rear suspension of a three-wheeled car according to a preferred embodiment of the present invention and indicating the simulated pivot point of the upper link and the lower link, which are engaged in up-and-down movement when a shock absorber and a bump are engaged in a rebound movement.
Figure 3:
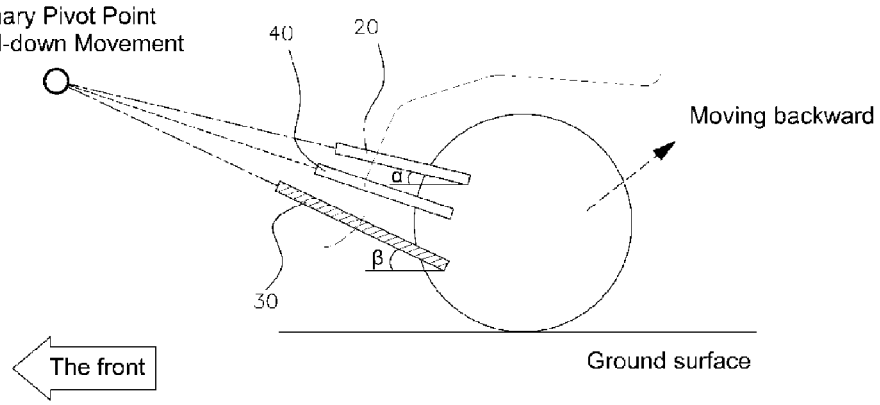

With reference to FIG. 2 and FIG. 3, the three-wheeled car of the present invention has two front wheels and one rear wheel installed. The rear suspension of the present invention, which connects the rear wheel 1 to the car body includes a wheel center 10, an upper link 20: 20a, 20b, a lower link 30: 30a, 30b and a trailing link 40.

In the rear wheel 1 of the present invention, an axis of rotation is connected to the wheel center 10 so that the rear wheel can be connected to the car body through links 20, 30, 40, and the wheel center 10 is arranged so that it faces the front part of the car body.

Below the wheel center 10 is installed a lower link 30, and above the wheel center is installed an upper link 20, wherein, one lower link 30 and one upper link 20 are respectively installed on each side of the wheel center 10. Also, a trailing link 40 is installed between a lower link 30 and an upper link 20 to connect a wheel center 10 and the car body, but it is connected to the car body so that it can perform an up-and-down rotation, and a shock absorber is installed on its upper part.

The upper link 20 and the lower link 30 are installed so that their connection point with the car body is located in a higher altitude than their connection point with a wheel center 10, and the angle of inclination from the ground is greater for a lower link than for an upper link. In other words, as illustrated in FIG. 3, the upper link and the lower link are installed so that the angle of a lower link $\beta$ from the ground is greater than the angle of inclination $\alpha$ of an upper link.

Hence, the imaginary pivot point of the up-and-down movement on the extension of an upper link 20 and a lower link 30 is situated at a higher position than the axis of rotation of a rear wheel 1, and a rear wheel is induced to move backward when the shock absorber is bumping. Such backward movement of a rear wheel increases the gap between a front wheel and a rear wheel to induce the improvement of the comfortability of a passenger by reducing the jiggling caused by the up-and-down movement of a shock absorber. At this time, preferably the up-and-down pivot point of a trailing link 40 is arranged so that it passes through the up-and-down pivot point of an upper link 20 and a lower link 30 to prevent interference in the up-and-down movement of the upper link 20 and the lower link 30.

The upper link 20 includes a first upper link 20a attached to one side of a wheel center 10 and a second upper link 20b attached to the other side of a wheel center 10 parallel to the first upper link 20a. Also, the first upper link 20a and the second upper link 20b are installed in a car-width direction so that it can perform the four-bar linkage movement.

At this time, in a link structure formed by the first lower link 20a and the second lower link 20b as well as in a link structure formed by the first upper link 30a and the second upper link 30b, the instantaneous centers situated on the intersection point of the extensions of the links in pair are arranged so that they are located to the rear of the axis of rotation. In other words, each link 20a, 20b, 30a, 30b is arranged so that, as illustrated in FIG. 4, four-bar linkage movement can be performed, and the upper link 20 and the lower link 30 are arranged so that the gap the car body span between the two connections points connected to the car body is greater than the gap the wheel center span between the two connection points connected to the wheel center.

In an exemplary embodiment of the present invention, an angle formed between the first and second upper links 30a and 30b is smaller than an angle formed between the first and second lower links 20a and 20b.

Figure 4:
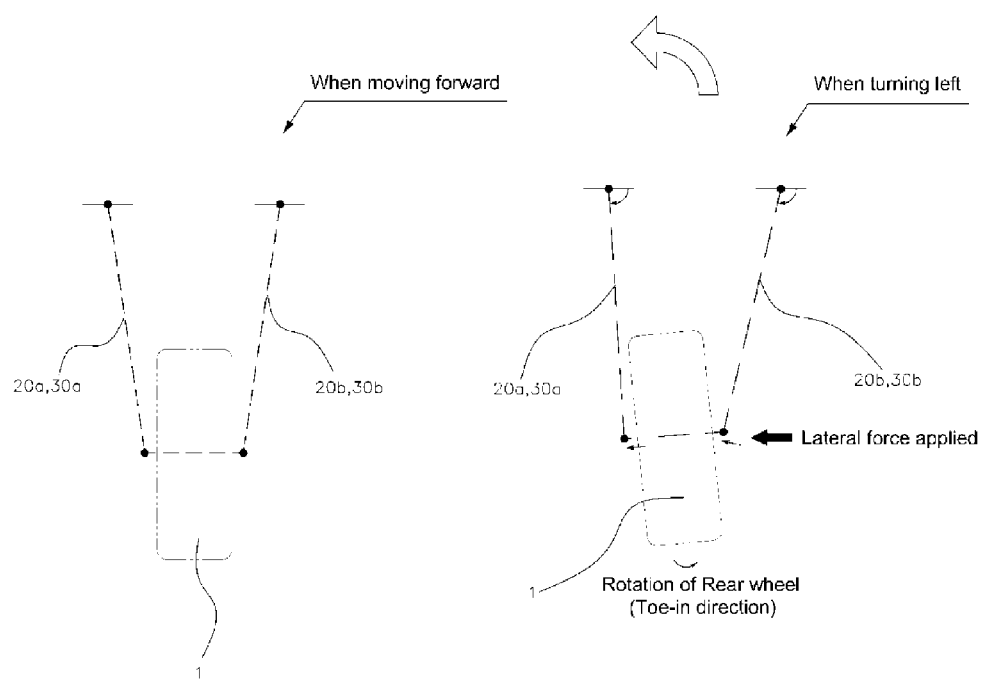
FIG. 4 is a reference view illustrating an upper link and a lower link performing a four-bar linkage movement.

Accordingly, as illustrated in FIG. 4, when the front wheel is moving straight forward, the rear wheel 1 does not turn, and however, when the front wheel is turning left, the rear wheel turns in the same direction by the lateral force applied on the rear wheel and hence the toe-in is induced.

Figure 5:
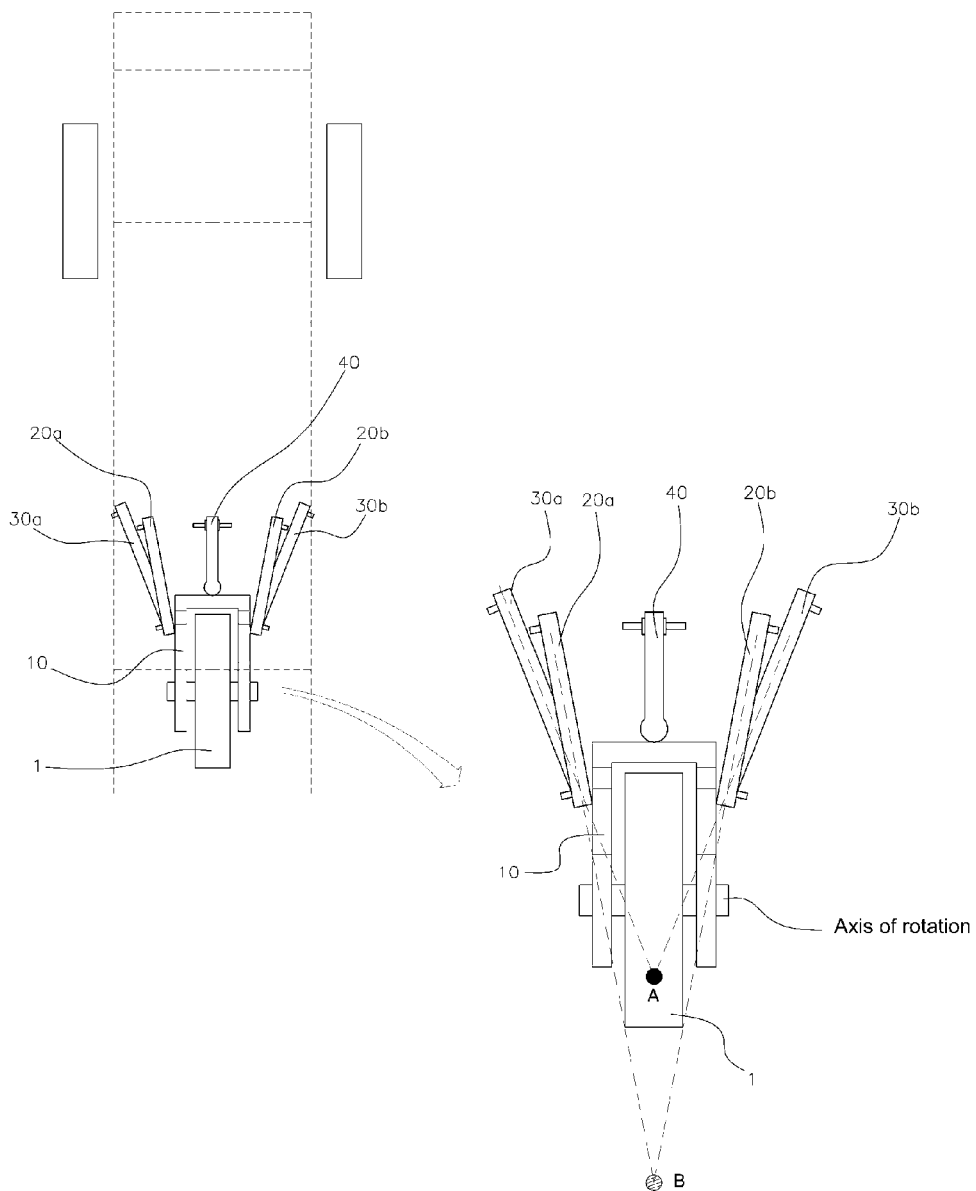
FIG. 5 is a top view illustrating the instantaneous point of an upper link situated to the rear of the instantaneous point of a lower link.

Meanwhile, in an exemplary embodiment of the present invention, the instantaneous center B of the upper link can be installed to the rear of the instantaneous center A of the lower link. In other words, as illustrated in FIG. 5, since the instantaneous center B of the lower links 30a, 30b are arranged to the rear of the upper links 20a, 20b, change in the camber angle can be induced depending on the difference in momentum during the linkage movement, and such change in the camber angle can improve the car's steering performance even more.

Furthermore, as described previously, the wheel center 10 is installed to the car body through a trailing link 40 and supported in a way that it is rotatable, but preferably the trailing link 40 is installed on the symmetric point of the upper links 20a, 20b and the lower links 30a, 30b.

The present invention having the composition described above has the effect of enhancing the stability when the car is turning by controlling the reduction in the lateral force of the rear wheel 1, and it also has the effect of improving the comfortability of a passenger by allowing the rear wheel 1 to move backward when the rear wheel 1 is moving up and down.

Furthermore, since the invention has the four-bar linkage structure, the length and diameter of the links can be controlled and hence the tuning factor is increased and consequently it has the advantage of increased flexibility in design. Also since its performance is increased through mechanical structural improvement without the electronic control, it is more reliable mechanically.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear suspension of a three-wheeled car with two front wheels and one rear wheel in a car frame comprises:
   a wheel center to which a rotation axis of the one rear wheel is rotatably coupled;
   an upper link with one end pivotally connected to a car body and the other end pivotally connected to one portion of the wheel center; and
   a lower link with one end pivotally connected to the car body below the one end of the upper link and the other end pivotally connected to the other portion of the wheel center below the other end of the upper link;
   wherein, the upper link and the lower link are installed to the car body so that the one end of the upper link is positioned higher than the other end thereof, and the one end of the lower link is positioned higher than the other end thereof;
   wherein an angle of inclination from the ground between the one end and the other end of the lower link is greater than an angle of inclination from the ground between the one end and the other end of the upper link;
   wherein the upper link includes a first upper link pivotally connected to one lateral side of the wheel center and a second upper link pivotally connected to the other lateral side of the wheel center to be symmetric to the first upper link, the first upper link and the second upper link being installed to perform a four-bar linkage movement with the car body and the rear wheel;
   wherein the lower link includes a first lower link pivotally connected to one lateral side of the wheel center and a second lower link pivotally connected to the other lateral side of the wheel center to be symmetric to the first lower link, the first lower link and the second lower link being installed to perform a four-bar linkage movement with the car body and the rear wheel; and
   wherein a first instantaneous center situated on intersection of extensions of the first upper link and the second upper link, and a second instantaneous center situated on intersection of extensions of the first lower link and the second lower link, are located to the rear of the rotation axis of the rear wheel.

2. The rear suspension of claim 1, wherein an angle formed between the first and second upper links is smaller than an angle formed between the first and second lower links.

3. The rear suspension of claim 1, wherein the first instantaneous center of the first and second upper links is located to the rear of the second instantaneous center of the first and second lower links.

4. The rear suspension of claim 1,
   wherein the wheel center is pivotally installed on the car body through a trailing link, and
   wherein the trail link is situated between the upper link and the lower link to form an axis of symmetry between the first upper link, the second upper link, the first lower link and the second lower link.

\* \* \* \* \*